May 29, 1928.
R. K. WINNING
FRICTION DETENT
Filed March 14, 1927
1,671,390
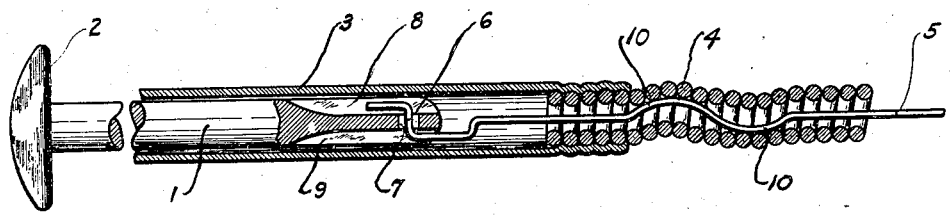
INVENTOR.
Robert K. Winning
BY
Erwin, Wheeler & Woolard
ATTORNEY.

Patented May 29, 1928.

1,671,390

UNITED STATES PATENT OFFICE.

ROBERT K. WINNING, OF WAUWATOSA, WISCONSIN, ASSIGNOR TO CLUM MANUFACTURING COMPANY, OF MILWAUKEE, WISCONSIN, A CORPORATION OF WISCONSIN.

FRICTION DETENT.

Application filed March 14, 1927. Serial No. 175,194.

This invention relates to improvements in friction detents.

It is the object of the invention to simplify the construction and reduce the expense of manufacture of friction detents used in connection with the reciprocable control of any part by means of a so-called Bowden wire and its flexible sheath or housing.

The drawing shows an axial section of a control device incorporating a friction detent embodying this invention.

The mounting of the parts is illustrated more particularly in my application No. 79,760, filed January 7, 1926, under a like title. The mounting, however, is not necessary to an understanding of the present invention in which the friction devices shown in such prior application have been eliminated.

A handle rod 1 headed at 2 for manual manipulation is axially reciprocable through a tubular housing 3 to which the flexible sheath 4 of the Bowden wire 5 is anchored in the usual manner. This sheath is made up of a helically wound piano wire, or the like, and forms a tube within which the wire 5 is guided for reciprocation.

The end of wire 5 is offset to provide a transverse coupling portion at 6 receivable through an aperture 7 which connects the longitudinal channels 8 and 9 in the end of the handle rod, thereby enabling the handle rod to transmit axial movement to the wire.

The present invention involves the formation of one or more reverse curves or undulations, as shown at 10, in the Bowden wire 5, bringing an intermediate portion of such wire into contact with opposite sides of the flexible sheath 4. The curvilinear bends 10 tend to maintain their respective positions in the crevices between successive coils or turns of the wound sheath 4 and hence act as a friction detent to maintain the handle rod 1 and Bowden wire 5 in any desired position of adjustment. The bends may, if desired, be made of such radius as to cause a slight distortion or flexing of the sheath at the location of the bend as illustrated in the drawing. Where this construction is adopted, the positioning of the parts is more positive than is the case if the bends are of just sufficient radius to contact yieldably the interior surfaces of successive coils in the sheath.

It will be obvious that by this simple expedient of producing slight bends in the Bowden wire, much expense may be saved in the manufacture and assembly of other forms of detents such as are usually applied to the handle rod.

I claim:

1. A device of the character described, including a flexible sheath, and a wire reciprocable therein and formed with a sheath distorting bend for pressure engagement with the interior of the sheath.

2. A device of the character described, comprising the combination with a flexible sheath, of a wire reciprocable therein and provided with reverse bends contacting opposite sides of the sheath, said bends having their outermost portions at a greater transverse spacing as measured transversely to the normal axis of said sheath than the normal interior diameter of the sheath, whereby the sheath is distorted slightly to accommodate it to said bends.

3. A device of the character described, including the combination with a helically wound wire sheath having crevices between its consecutive turns, of a member reciprocable in said sheath and provided with offset portions adapted yieldably to engage in said crevices.

4. A device of the character described, including the combination with a helically wound wire sheath having crevices between its consecutive turns, of a member reciprocable in said sheath and provided with offset portions adapted yieldably to engage in said crevices, said member comprising a wire and said portions comprising an offset curvilinear bend therein of such dimensions as to distort said sheath.

ROBERT K. WINNING.